(12) United States Patent
Zimmanck

(10) Patent No.: US 10,903,654 B2
(45) Date of Patent: Jan. 26, 2021

(54) METHOD AND APPARATUS FOR MINIMIZING CIRCULATING CURRENTS IN MICROGRIDS

(71) Applicant: Enphase Energy, Inc., Petaluma, CA (US)

(72) Inventor: Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 772 days.

(21) Appl. No.: 15/369,363

(22) Filed: Dec. 5, 2016

(65) Prior Publication Data
US 2017/0163037 A1 Jun. 8, 2017

Related U.S. Application Data

(60) Provisional application No. 62/262,663, filed on Dec. 3, 2015.

(51) Int. Cl.
| | | |
|---|---|---|
| H02J 1/00 | (2006.01) | |
| H02J 3/00 | (2006.01) | |
| H02J 3/18 | (2006.01) | |
| H02J 3/38 | (2006.01) | |

(52) U.S. Cl.
CPC .......... *H02J 3/1878* (2013.01); *H02J 3/381* (2013.01); *Y02E 40/30* (2013.01)

(58) Field of Classification Search
CPC .......... H02J 3/1878; H02J 3/381; Y02E 40/30
USPC .......................................................... 307/84
See application file for complete search history.

(56) References Cited

U.S. PATENT DOCUMENTS

| | | | | |
|---|---|---|---|---|
| 2,200,979 A | | 5/1940 | Blume | |
| 5,136,233 A | * | 8/1992 | Klinkenberg | G05F 1/20 323/255 |
| 5,498,954 A | * | 3/1996 | Bassett | G05F 1/14 323/255 |
| 5,581,173 A | | 12/1996 | Yalla et al. | |
| 7,687,937 B2 | | 3/2010 | Lasseter et al. | |

(Continued)

FOREIGN PATENT DOCUMENTS

| | | |
|---|---|---|
| CN | 103545905 A | 1/2014 |
| CN | 104218590 A | 12/2014 |
| CN | 104377735 A | 2/2015 |

OTHER PUBLICATIONS

Kashem et al., "Distributed Generation as Voltage Support for Single Wire Earth Return Systems", IEEE Transactions on Power Delivery, vol. 19, Issue 3, pp. 1002-1011, Jul. 2004.

(Continued)

*Primary Examiner* — Richard Tan
(74) *Attorney, Agent, or Firm* — Moser Taboada

(57) ABSTRACT

A method and apparatus for minimizing circulating currents on a power distribution line. In one embodiment, the method comprises dynamically adjusting a turns ratio of a tap changing transformer, the tap changing transformer coupled to a power grid distribution line that is also coupled to a plurality of microgrid branches wherein at least one microgrid branch of the plurality of microgrid branches comprises a distributed energy resource (DER), based on a reactive power measured locally to the tap changing transformer, to minimize current circulating on the power grid distribution line.

20 Claims, 4 Drawing Sheets

(56) References Cited

U.S. PATENT DOCUMENTS 8,321,162 B2  11/2012  Labuschagne et al.
8,830,712 B2  9/2014  Fischer

OTHER PUBLICATIONS

Kashem et al., "Multiple Distributed Generators for Distribution Feeder Voltage Support", IEEE Transactions on Energy Conversion, vol. 20, Issue 3, pp. 676-684, Sep. 2005.

Pogaku et al., "Modeling, Analysis and Testing of Autonomous Operation of an Inverter-Based Microgrid", IEEE Transactions on Power Electronics, vol. 22, Issue 2, pp. 613-625, Mar. 2007.

Brabandere et al., "Control of Microgrids", IEEE Power Engineering Society General Meeting, pp. 8, Jun. 24-28, 2007.

Brabandere et al., "A Voltage and Frequency Droop Control Method for Parallel Inverters", IEEE Transactions on Power Electronics, vol. 22, Issue 4, pp. 1107-1115, Jul. 2007.

Sao et al., "Control and Power Management of Converter Fed Microgrids", IEEE Transactions on Power Systems, vol. 23, Issue 3, pp. 1088-1098, Aug. 2008.

Iyer et al., "A Generalized Computational Method to Determine Stability of a Multi-inverter Microgrid", IEEE Transactions on Power Electronics, vol. 25, Issue 9, pp. 2420-2432, Sep. 2010.

Vasquez et al., "Adaptive Droop Control Applied to Voltage-Source Inverters Operating in Grid-Connected and Islanded Modes", IEEE Transactions on Industrial Electronics, vol. 56, Issue 10, pp. 4088-4096, Oct. 2009.

Majumder et al., "Droop Control of Converter-Interfaced Microsources in Rural Distributed Generation", IEEE Transactions on Power Delivery, vol. 25, Issue 4, pp. 2768-2778, Oct. 2010.

Yao et al., "Design and Analysis of the Droop Control Method for Parallel Inverters Considering the Impact of the Complex Impedance on the Power Sharing", IEEE Transactions on Industrial Electronics, vol. 58, Issue 2, pp. 576-588, Feb. 2011.

Kim et al., "Mode Adaptive Droop Control With Virtual Output Impedances for an Inverter-Based Flexible AC Microgrid", IEEE Transactions on Power Electronics, vol. 26, Issue 3, pp. 689-701, Mar. 2011.

Perera et al., "Distribution Feeder Voltage Support And Power Factor Control By Distributed Multiple Inverters", IEEE Electrical Power and Energy Conference (EPEC), 2011.

Rocabert et al., "Control of Power Converters in AC Microgrids", IEEE Transactions on Power Electronics, vol. 27, Issue 11, pp. 4734-4749, Nov. 2012.

\* cited by examiner

METHOD AND APPARATUS FOR MINIMIZING CIRCULATING CURRENTS IN MICROGRIDS

CROSS-REFERENCE TO RELATED APPLICATIONS

This application claims benefit of U.S. provisional patent application Ser. No. 62/262,663, entitled "Strategy for Minimizing Circulating Currents in Microgrids" and filed Dec. 3, 2015, which is herein incorporated in its entirety by reference.

BACKGROUND OF THE INVENTION

Field of the Invention

Embodiments of the present disclosure relate generally to minimizing circulating currents in microgrids.

Description of the Related Art

Droop control is an industry standard technique for autonomously sharing load among parallel AC generator/inverters proportional to their power ratings. The technique relies on using small changes in voltage and frequency to dictate changes in real and reactive power levels. While all generators see the same frequency, due to voltage drops on the distribution lines not all generators will see the same voltage. Because of this, some current will end up circulating between generators as each generator attempts to support a target voltage.

Therefore, there is a need in the art for a technique to efficiently minimize the circulating current.

SUMMARY OF THE INVENTION

Embodiments of the present invention generally relate to minimizing circulating currents in microgrids as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
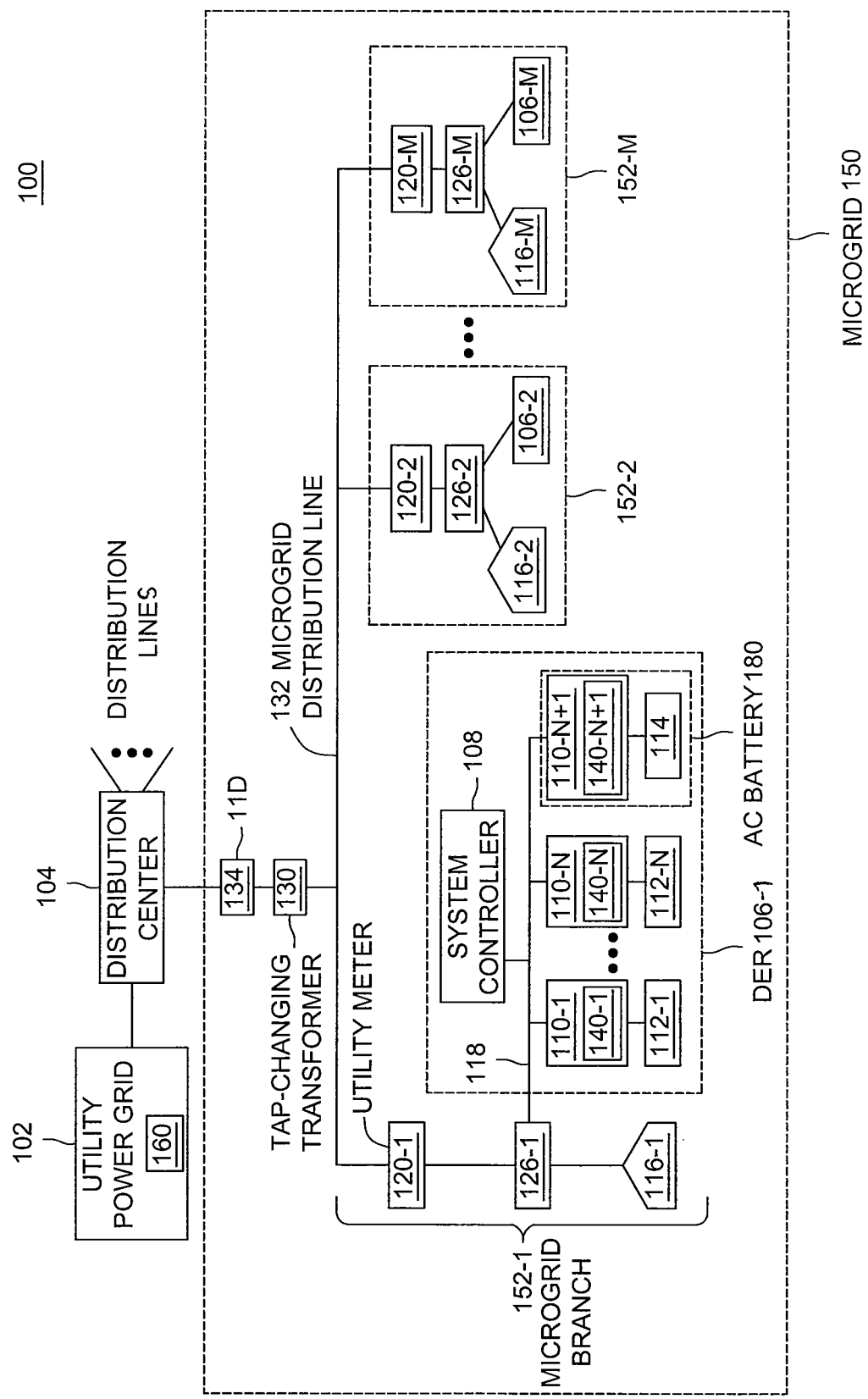
FIG. 1 is a block diagram of a system for power distribution in accordance with one or more embodiments of the present invention.

FIG. 1 is a block diagram of a system 100 for power distribution in accordance with one or more embodiments of the present invention. This diagram only portrays one variation of the myriad of possible system configurations. The present invention can function in a variety of environments and systems.

The system 100 comprises a utility power grid 102 coupled by high-voltage transmission lines to a distribution center 104, which may be further coupled to other distribution centers (not shown). The distribution center 104 is coupled to a microgrid 150 which comprises a plurality of microgrid branches 152-1, 152-2 . . . 152-M (collectively referred to as microgrid branches 152) coupled in parallel via a microgrid distribution line 132, where the microgrid distribution line 132 is coupled to the distribution center 104 via an island interconnect device (IID) 134. The IID 134 enables the microgrid 120 to connect to/disconnect from the utility grid as necessary.

The microgrid branches 152 are coupled to the IID 134 via a tap-changing multi-tap transformer 130. In the embodiment depicted in FIG. 1, the utility power grid 102 comprises a controller 160 for controlling the tap changing transformer 130, although in some other embodiments the controller 160 may be part of the tap-changing transformer 130 or locally connected to the tap-changing transformer 130. The controller 160 may communicate command instructions to the tap changing transformer 130 by any suitable means, such as power line communications (PLC), other types of wired communication, and/or wireless communication. The controller 160 may autonomously control the tap changing transformer 130; additionally or alternatively, the tap changing transformer 130 may be manually controlled, e.g., by commands issued via the controller 160. For example, the tap of the tap changing transformer 130 may be manually changed as needed, such as when there are new customers on the line or there is a complaint that the voltage feeding a customer is out of range. In one or more embodiments there may be a plurality of tap changing transformers 130 coupled to the IID 134, where each of the tap changing transformers 130 is coupled to a different subset of the microgrid branches 152.

Each microgrid branch 152-1 . . . 152-M comprises a respective building 116-1 . . . 116-M (e.g., a residence, commercial building, or the like), collectively referred to as buildings 116, coupled to a respective load center 126-1 . . . 126-M, collectively referred to as load centers 126, where the load center 126 may be within or proximate to the corresponding building 116. Each load center 126-1 . . . 126-M is further coupled via a respective utility meter 120-1 . . . 120-M (collectively referred to as utility meters 120) to the microgrid distribution line 132, and also to a respective distributed energy resource (DER) 106-1 . . . 106-M (collectively referred to as DERs 106). Each load center 126 couples power between the corresponding building 116 (i.e., one more loads associated with the building 116), the corresponding DER 106, and the corresponding distribution line 132.

Each DER 106 comprises power conditioners 110-1 . . . 110-N, 110-N+1 coupled in parallel to an AC bus 118 (which may also be referred to as a DER distribution line) that is coupled to the load center 126, where the number "N" may vary in value among the DERs 106 within different microgrid branches 152. Generally the power conditioners 110 are bi-directional power conditioners and a first subset of the power conditioners 110 (e.g., power conditioners 110-1 through 110-N as shown in FIG. 1) is coupled to DC energy sources (for example, renewable energy sources such as wind, solar, hydro, and the like) while a second subset of the power conditioners 110 (e.g., power conditioner 110-M as shown in FIG. 1) is coupled to energy storage devices (e.g., batteries, flywheel, compressed air storage, or the like), where a power conditioner 110 and the corresponding energy storage device may be referred to an AC battery.

In the embodiment depicted in FIG. 1, the power conditioners 110-1 . . . 110-N are coupled to the DC energy sources 112-1 . . . 112-N, respectively, for receiving DC power and generating commercial power grid compliant AC power that is coupled to the AC bus 118. As further depicted in FIG. 1, the power conditioner 110-N+1 is coupled to an energy storage device 114 to form an AC battery 180. For the AC battery 180, the power conditioner 110 can convert power from the bus 118 to energy that is stored in the energy storage device 114, and can convert energy stored in the energy storage device 114 to commercial power grid compliant AC power that is coupled to the AC bus 118. In some embodiments, one or more power conditioners 110 may be coupled to an energy storage device such as a hot water heater, an electric car, or the like.

In one or more embodiments, each DC source 112 is a photovoltaic (PV) module; in certain embodiments, multiple DC sources 112 are coupled to a power conditioner 110 (e.g., a single, centralized power conditioner). In some alternative embodiments, the power conditioners 110 are DC-DC power converters that generate DC power and couple the generated power to a DC bus and subsequent DC system; such DC-DC power converters also may receive power from the DC bus and convert the received power to energy that is then stored in an energy storage device.

A system controller 108 for the DER 106 is coupled to the AC bus 118 and communicates with the power conditioners 110 (e.g., via power line communications (PLC) and/or other types of wired and/or wireless techniques). The system controller 108 generally comprises a CPU coupled to each of a transceiver, support circuits, and a memory that stores the operating system (if necessary) as well as various forms of application software, such as a DER control module for controlling some operational aspects of the DER 106 and/or monitoring the DER 106 (e.g., issuing certain command and control instructions to one or more of the power conditioners 110, collecting data related to the performance of the power conditioners 110, and the like). The system controller 108 may send command and control signals to one or more of the power conditioners 110 and/or receive data (e.g., status information, data related to power conversion, and the like) from one or more of the power conditioners 110. In some embodiments, the system controller 108 is further coupled, by wireless and/or wired techniques, to a master controller via a communication network (e.g., the Internet) for communicating data to/receiving data from the master controller (e.g., system performance information and the like).

Each of the power conditioners 110 is a droop-controlled converter such that when one or more of the microgrid branches 152 (or the entire microgrid 150) is disconnected from the distribution center 104 (e.g., using the IID 134, an IID installed on the microgrid branch (not shown) or the system controller 108, which may comprise an IID or portion of an IID), the power conditioners 110 employ a droop control technique for parallel operation without the need for any common control circuitry or communication between the power conditioners 110. Each of the power converters 110 comprises a controller 140 having a droop control module for implementing the droop control techniques, thereby allowing the power conditioners 110 to share the load in a safe and stable manner.

As power drawn by loads within the various microgrid branches 152 changes, corresponding voltage drops along the distribution line 132 occur. In accordance with one or more embodiments of the present invention, each of the droop-controlled DERs 106 is responsible for maintaining local voltage quality while the tap changing transformer 130 operate to reduce or minimize circulating currents within the microgrid 150 that result from currents injected by the DERs 106 for maintaining local voltage quality control. Rather than addressing voltage quality issues by changing the settings of the tap changing transformer 130, the tap changing transformer 130 operates to maximize efficiency of the microgrid distribution line 132 while the DERs 106 are solely responsible for maintaining voltage quality.

During operation, each of the power conditioners 110 is continuously measuring its local voltage. As such, each of the DERs 106 can independently determine and inject the appropriate amount of reactive current to compensate for any local voltage drop (e.g., DERs 106 closer to a load that is drawing a large amount of power will inject a greater amount of current than those farther away), thereby equalizing the local voltage as necessary to maintain the local voltage quality. The droop-controlled DERs 106 can thus quickly and accurately manage voltage drops with circulating current they provide, although at the expense of reduced distribution efficiency due to the high currents.

In order to minimize the circulating current, the tap points of the tap changing transformer 130 (or some combination) can be changed to offset the impedance that each building 116 sees back to the main grid (e.g., the microgrid distribution line 132), where the direction of the tap change is a function of the power factor measured locally to the tap-changing transformer 130. As such, the tap changes on the tap-changing transformer 130 are only responsible for maximizing the efficiency of the distribution line and not for maintaining local voltage quality control. In some embodiments, the tap-changing transformer 130 autonomously detects and measures the increase in reactive current on the microgrid distribution line 132 and appropriately adjusts the tap settings to reduce the amount of current that each DER 106 needs to inject to maintain voltage quality. In other embodiments, the utility meter 120 may detect the increase in reactive current and issue the appropriate commands to the tap-changing transformer 130 (e.g., via PLC, other types of wired communications, or wireless communications) for minimizing the current required.

By utilizing the DERs 106 to maintain voltage quality and utilizing tap changes at the tap-changing transformer 130 only for maximizing the efficiency of the distribution line, the DER control and the tap change control work collaboratively. Tap changes can be scheduled to achieve an economic optimum, for example by balancing the expense associated with having a higher loss on the distribution line with the expense associated with the mechanical stress that tap-changing transformers experience during each tap change operation. This allows a power system to operate with fewer overall tap changes which will increase the lifetime of the equipment, leading to less maintenance costs. Additionally, a failed tap changing transformer 130 will no longer cause over-voltage or under-voltage failures, it will simply cause the system to operate a sub-optimal efficiency; equipment servicing can then be scheduled with less urgency and at lower cost. Generally, the number of DERs 106 within the microgrid 150 is such that the DERs 106 provide on the order of 20% of the system's generation, although some embodiments may have more or fewer DERs 106.

Figure 2:
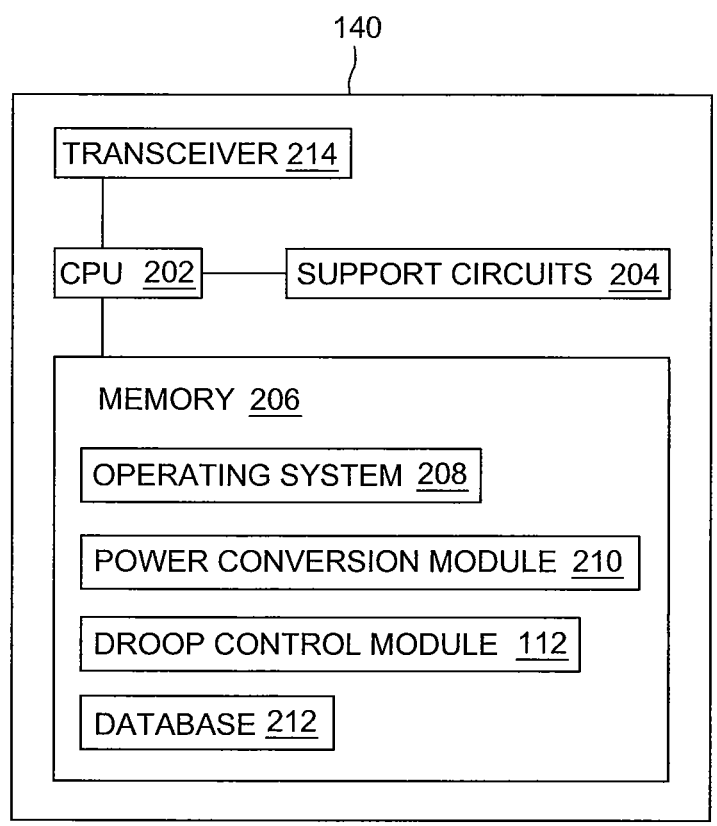
FIG. 2 is a block diagram of a controller in accordance with one or more embodiments of the present invention.

FIG. 2 is a block diagram of a controller 140 in accordance with one or more embodiments of the present invention. The controller 140 comprises a transceiver 214, support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The controller 140 may be implemented using a general purpose computer that, when executing particular software, becomes a specific purpose computer for performing various embodiments of the present invention. In one or more embodiments, the CPU 202 may be a microcontroller comprising internal memory for storing controller firmware that, when executed, provides the controller functionality described herein.

The transceiver 214 may be coupled to the power conditioner's output lines for communicating with the system control module 108 and/or other power conditioners 110 using power line communications (PLC). Additionally or alternatively, the transceiver 214 may communicate with the system control module 108 and/or other power conditioners 110 using other type of wired communication techniques and/or wireless techniques.

The support circuits 204 are well known circuits used to promote functionality of the CPU 202. Such circuits include, but are not limited to, a cache, power supplies, clock circuits, buses, input/output (I/O) circuits, and the like.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the controller 114 that can be supported by the CPU capabilities. In some embodiments, the OS 208 may be one of a number of commercially available operating systems such as, but not limited to, LINUX, Real-Time Operating System (RTOS), and the like.

The memory 206 stores various forms of application software, such as a power conversion module 210 for controlling power conversion by the power conditioner 110, and a droop control module 112 for employing droop control techniques as described herein. The memory 206 additionally stores a database 212 for storing data related to the operation of the power converter 110 and/or the present invention, such as one or more formulas for the droop control techniques, including maintaining local voltage quality, described herein.

Figure 3:
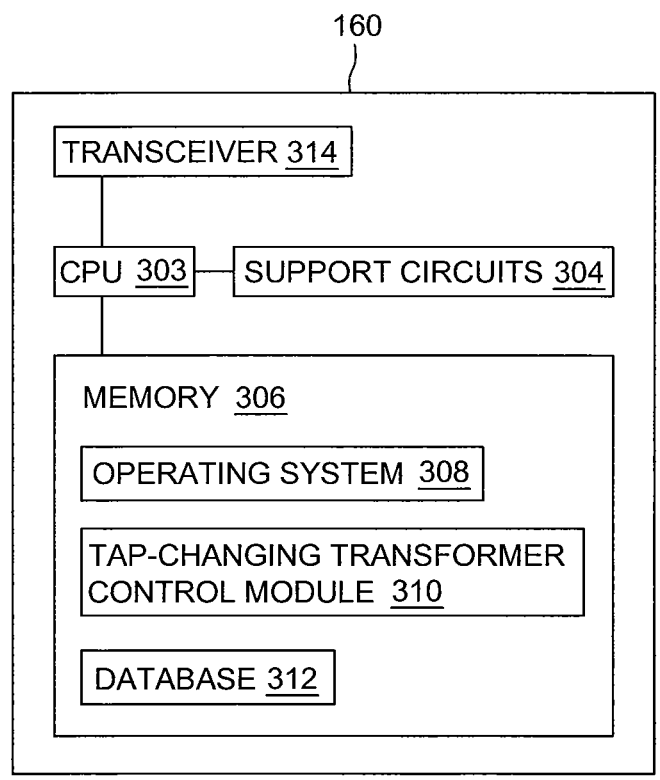
FIG. 3 is a block diagram of a controller in accordance with one or more embodiments of the present invention.

FIG. 3 is a block diagram of a controller 160 in accordance with one or more embodiments of the present invention. The controller 160 comprises a transceiver 314, support circuits 304 and a memory 306, each coupled to a central processing unit (CPU) 302. The CPU 302 may comprise one or more conventionally available microprocessors or microcontrollers; alternatively, the CPU 302 may include one or more application specific integrated circuits (ASICs). The controller 160 may be implemented using a general purpose computer that, when executing particular software, becomes a specific purpose computer for performing various embodiments of the present invention. In one or more embodiments, the CPU 302 may be a microcontroller comprising internal memory for storing controller firmware that, when executed, provides the controller functionality described herein.

The transceiver 314 communicates with the tap changing transformer 130 for controlling the tap changing transformer 130 (i.e., increasing or decreasing the turns ratio of the transformer 130). In some alternative embodiments where the controller 160 is part of the tap changing transformer 130, the transceiver 314 may communicate with the utility meters 120 and/or the utility power grid (e.g., via wired communication such as PLC, or wireless communication).

The support circuits 304 are well-known circuits used to promote functionality of the CPU 302. Such circuits include, but are not limited to, a cache, power supplies, clock circuits, buses, input/output (I/O) circuits, and the like.

The memory 306 may comprise random access memory, read only memory, removable disk memory, flash memory, and various combinations of these types of memory. The memory 306 is sometimes referred to as main memory and may, in part, be used as cache memory or buffer memory. The memory 306 generally stores the operating system (OS) 308, if necessary, of the controller 160 that can be supported by the CPU capabilities. In some embodiments, the OS 308 may be one of a number of commercially available operating systems such as, but not limited to, LINUX, Real-Time Operating System (RTOS), and the like.

The memory 306 stores various forms of application software, such as a tap changing transformer control module 310 for controlling the tap changing transformer 130 as described herein. In some alternative embodiments where the controller 160 is part of the tap changing transformer 130 or coupled locally to the tap changing transformer 130, the control module 310 may obtain measurements of the reactive power and/or power factor on the line local to the tap changing transformer 130, e.g., by measuring the line or received via the transceiver 314. Detail on the functionality provided by the tap changing transformer control module 310 module is described below with respect to FIG. 4.

The memory 306 additionally stores a database 312 for storing data, such as data related to the present invention (e.g., one or more thresholds described herein). In other embodiments, the CPU 302 may be a microcontroller comprising internal memory for storing controller firmware that, when executed, provides the controller functionality described below with respect to FIG. 4.

Figure 4:
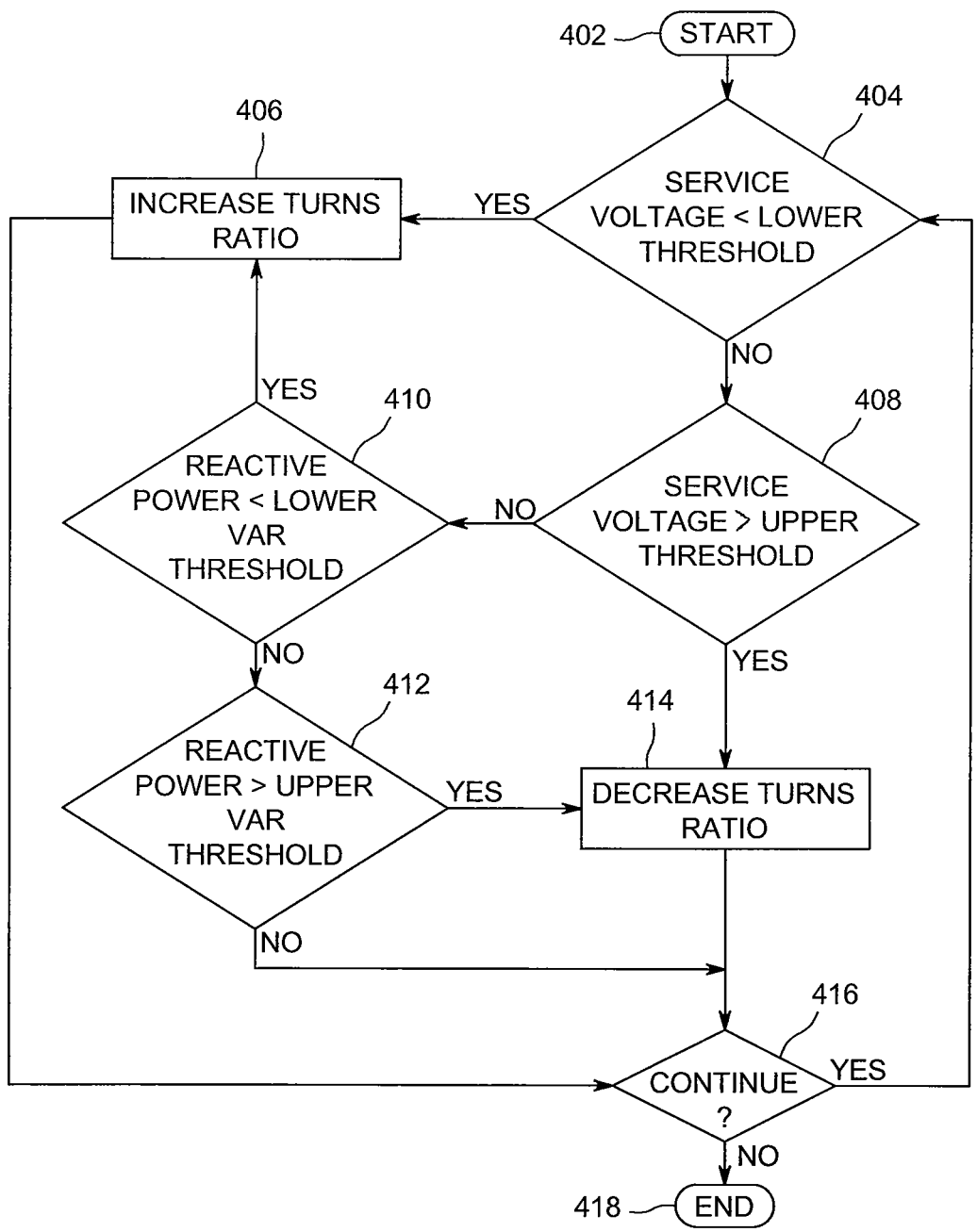
FIG. 4 is a flow diagram of a method for controlling circulating currents in a microgrid in accordance with one or more embodiments of the present invention.

FIG. 4 is a flow diagram of a method 400 for controlling circulating currents in a microgrid, such as the microgrid 150, in accordance with one or more embodiments of the present invention. The method 400 represents one embodiment of an implementation of the tap changing transformer control module 310. In certain embodiments, the controller 160 (including the control module 310) may be part of a tap changing transformer 130 and the tap changing transformer 130 may autonomously perform the method 400. In other embodiments, the controller 160 (including the control module 310) may be external to the tap changing transformer 130 and the tap changing transformer 130 receives commands (which may be automatically or manually issued) for changing its settings as a result of the execution of the control module 310. In some alternative embodiments, a computer readable medium comprises a program that, when executed by a processor, performs at least a portion of the method 400 that is described in detail below.

The method 400 starts at step 402 and proceeds to step 404. At step 404 a determination is made whether the service voltage at a tap changing transformer coupled to at least one microgrid branch (e.g., the tap changing transformer 130) is below a lower threshold. In some embodiments, the service voltage may be measured by the tap changing transformer; in other embodiments, the service voltage may be measured by a utility meter coupled to the tap changing transformer (e.g., the utility meter 120) or another component local to the tap changing transformer. If the result of the determination is yes, that the service voltage is below a lower threshold, the method 400 proceeds to step 406.

At step 406; the turns ratio of the tap changing transformer is increased. In some embodiments, the tap changing transformer may autonomously increase the turns ratio; in other embodiments, an electronic command may be automatically or manually issued to the tap changing transformer to increase the turns ratio. The method 400 then proceeds to step 416.

If the result of the determination at step 404 is no, that the service voltage is not below the lower threshold, the method 400 proceeds to step 408. At step 408, a determination is made whether the service voltage is above an upper threshold. Both the lower threshold (of step 404) and the upper threshold (of step 408) are service voltage minimum and maximum thresholds, respectively, which may be standard thresholds as determined by, for example, the American National Standards Institute or some other geographic standard.

If the result of the determination at step 408 is yes, that the service voltage is above the upper threshold, the method 400 proceeds to step 414. At step 414, the turns ratio of the tap changing transformer is decreased. In some embodiments, the tap changing transformer may autonomously decrease the turns ratio; in other embodiments, an electronic command may be automatically or manually issued to the tap changing transformer to decrease the turns ratio. The method 400 then proceeds to step 416.

If, at step 408, the result of the determination is no, that the service voltage is not above the upper threshold (i.e., the service voltage is between the lower threshold and the upper threshold), the method 400 proceeds to step 410.

At step 410, a determination is made whether the reactive power measured at or proximate to the tap changing transformer is below a lower volt-amperes reactive (VAR) threshold. In some embodiments, the reactive power may be measured by the tap changing transformer; in other embodiments, the reactive power may be measured by a utility meter coupled to the tap changing transformer (e.g., the utility meter 120) or another component local to the tap changing transformer. If the result of the determination is yes, that the reactive power is below the lower VAR threshold, the method 400 returns to step 406 where the tap changing transformer turns ratio is increased. If the result of the determination is no, the method 400 proceeds to step 412.

At step 412, a determination is made whether the reactive power is above an upper VARs threshold. Both the lower VAR threshold (of step 412) and the upper VAR threshold (of step 412) may be determined based on a tradeoff analysis, where small values for the lower and upper VAR thresholds will keep the circulating current very close to the minimum but will result in more rapid degradation of the tap changing transformer due to increased number of tap changes, and large values of the lower and upper VAR thresholds will minimize the use of tap changes but will allow larger circulating currents before implementing a tap change. In some embodiments, the absolute value of the lower and upper VAR thresholds may be 5% of the kVA rating of the tap changing transformer. For example, for a 100 kVA tap changing transformer, the lower and upper VAR thresholds may be set at −5 kVar and 5 kVar, respectively. In other embodiments, the absolute values of the lower and upper VAR thresholds may differ from one another.

If the result of the determination at step 412 is yes, that the reactive power is above the upper VARs threshold, the method 400 proceeds to step 414 where the tap changing transformer turns ratio is decreased. If the result of the determination at step 412 is no, that the reactive power is not above the upper VARs threshold, the method 400 proceeds to step 416.

At step 416, a determination is made whether to continue. If the result of the determination is yes, the method 400 returns to step 404. If the result of the determination is no, the method 400 proceeds to step 418 where it ends.

While the foregoing is directed to embodiments of the present invention, other and further embodiments of the invention may be devised without departing from the basic scope thereof, and the scope thereof is determined by the claims that follow.

The invention claimed is:

1. A method for minimizing circulating currents on a power distribution line, comprising:
   dynamically adjusting a turns ratio of a tap changing transformer, the tap changing transformer coupled to a power grid distribution line that is also coupled to a plurality of microgrid branches wherein at least one microgrid branch of the plurality of microgrid branches comprises a distributed energy resource (DER), based on a reactive power measured locally to the tap changing transformer and independent of local voltage quality, to minimize current circulating on the power grid distribution line.

2. The method of claim 1, wherein the turns ratio is autonomously adjusted based on the measured reactive power.

3. The method of claim 1, wherein the direction of change for the turns ratio is determined by comparing the measured reactive power to a VAR threshold.

4. The method of claim 1, wherein dynamically adjusting the turns ratio comprises increasing the turns ratio when the measured reactive power is below a lower threshold.

5. The method of claim 1, wherein dynamically adjusting the turns ratio comprises decreasing the turns ratio when the measured reactive power exceeds an upper threshold.

6. The method of claim 1, wherein dynamically adjusting the turns ratio comprises scheduling changes to the turns ratio to achieve an economic optimum.

7. The method of claim 6, wherein the changes to the turns ratio are scheduled based on a comparison of an expense associated with a loss on the power grid distribution line and an expense associated with mechanical stress to the tap changing transformer that results from changing the turns ratio.

8. Apparatus for minimizing circulating currents on a power distribution line, comprising:
   a controller, comprising at least one processor, for determining an adjustment for a turns ratio of a tap changing transformer, the tap changing transformer coupled to a power grid distribution line that is also coupled to a plurality of microgrid branches wherein at least one microgrid branch of the plurality of microgrid branches comprises a distributed energy resource (DER), based on a reactive power measured locally to the tap changing transformer and independent of local voltage quality, to minimize current circulating on the power grid distribution line.

9. The apparatus of claim 8, wherein the controller autonomously adjusts the turns ratio based on the measured reactive power.

10. The apparatus of claim 8, wherein the direction of change for the turns ratio is determined by comparing the measured reactive power to a VAR threshold.

11. The apparatus of claim 8, wherein determining an adjustment for the turns ratio comprises determining an increase in the turns ratio when the measured reactive power is below a lower threshold.

12. The apparatus of claim 8, wherein determining an adjustment for the turns ratio comprises determining a decrease in the turns ratio when the measured reactive power exceeds an upper threshold.

13. The apparatus of claim 8, wherein dynamically adjusting the turns ratio comprises scheduling changes to the turns ratio to achieve an economic optimum.

14. The apparatus of claim 13, wherein the determined adjustment to the turns ratio is scheduled based on a comparison of an expense associated with a loss on the power grid distribution line and an expense associated with mechanical stress to the tap changing transformer that results from changing the turns ratio.

15. A non-transitory computer readable medium comprising a program that, when executed by a processor, performs a method for minimizing circulating currents on a power distribution line, the method comprising:

dynamically adjusting a turns ratio of a tap changing transformer, the tap changing transformer coupled to a power grid distribution line that is also coupled to a plurality of microgrid branches wherein at least one microgrid branch of the plurality of microgrid branches comprises a distributed energy resource (DER), based on a reactive power measured locally to the tap changing transformer and independent of local voltage quality, to minimize current circulating on the power grid distribution line.

16. The non-transitory computer readable medium of claim 15, wherein the method further comprises determining a direction of change for the turns ratio by comparing the measured reactive power to a VAR threshold.

17. The non-transitory computer readable medium of claim 15, wherein dynamically adjusting the turns ratio comprises increasing the turns ratio when the measured reactive power is below a lower threshold.

18. The non-transitory computer readable medium of claim 15, wherein dynamically adjusting the turns ratio comprises decreasing the turns ratio when the measured reactive power exceeds an upper threshold.

19. The non-transitory computer readable medium of claim 15, wherein dynamically adjusting the turns ratio comprises scheduling changes to the turns ratio to achieve an economic optimum.

20. The non-transitory computer readable medium of claim 19, wherein the method further comprises scheduling changes to the turns ratio by comparing an expense associated with a loss on the power grid distribution line and an expense associated with mechanical stress to the tap changing transformer that results from changing the turns ratio.

* * * * *